United States Patent [19]
Simon

[11] Patent Number: 5,910,963
[45] Date of Patent: Jun. 8, 1999

[54] LASER RESONATOR DESIGN WITH IMPROVED SIGNAL-TO-NOISE LEVEL (S/N) AT THE OUTPUT OF A SINGLE-MODE FIBER-COUPLED MULTI-WAVELENGTH LASER PROVIDING ILLUMINATION FOR A LASER SCANNING MICROSCOPE

[75] Inventor: Ulrich Simon, Jena, Germany

[73] Assignee: Carl Zeiss Jena GmbH, Jena, Germany

[21] Appl. No.: 08/838,313

[22] Filed: Apr. 8, 1997

[51] Int. Cl.⁶ .............................. H01S 3/08; G02B 21/00
[52] U.S. Cl. ............................ 372/98; 372/23; 372/99; 372/101; 372/107; 372/108; 359/368
[58] Field of Search .................... 372/18, 19, 9, 372/22, 23, 69, 70, 92, 96, 98, 99, 101, 107, 108; 359/368

[56] References Cited

U.S. PATENT DOCUMENTS

| | | | |
|---|---|---|---|
| 3,777,280 | 12/1973 | Pohl | 372/19 X |
| 4,426,707 | 1/1984 | Martin et al. | 372/95 |
| 4,951,285 | 8/1990 | Cole et al. | 372/19 |
| 5,513,196 | 4/1996 | Bischel et al. | 372/22 |

*Primary Examiner*—Brian Healy
*Attorney, Agent, or Firm*—McAulay Nissen Goldberg Kiel & Hand, LLP

[57] ABSTRACT

A single-mode fiber-coupled multi-wavelength laser, wherein, for suppressing higher order transverse modes of the laser cavity than $TEM_{oo}$ of at least one laser emission wavelength or for increasing the beam waist diameters of the transverse laser cavity modes or for increasing the signal-to-noise level of the output of the laser at least at one emission wavelength, one or more of the following is selected:

a) at least one resonator mirror movable along the resonator axis in order to vary the resonator length;
b) at least one resonator mirror tiltable until a surface normal thereof encloses an angle ($0\neq0$) with the resonator axis;
c) at least one resonator mirror being replaced by another concave mirror with different curvature radius;
d) at least one resonator mirror being replaced by a flat mirror; and
e) at least one mirror holder allowing the interchangeable use of several mirrors with different curvature radii.

14 Claims, 5 Drawing Sheets

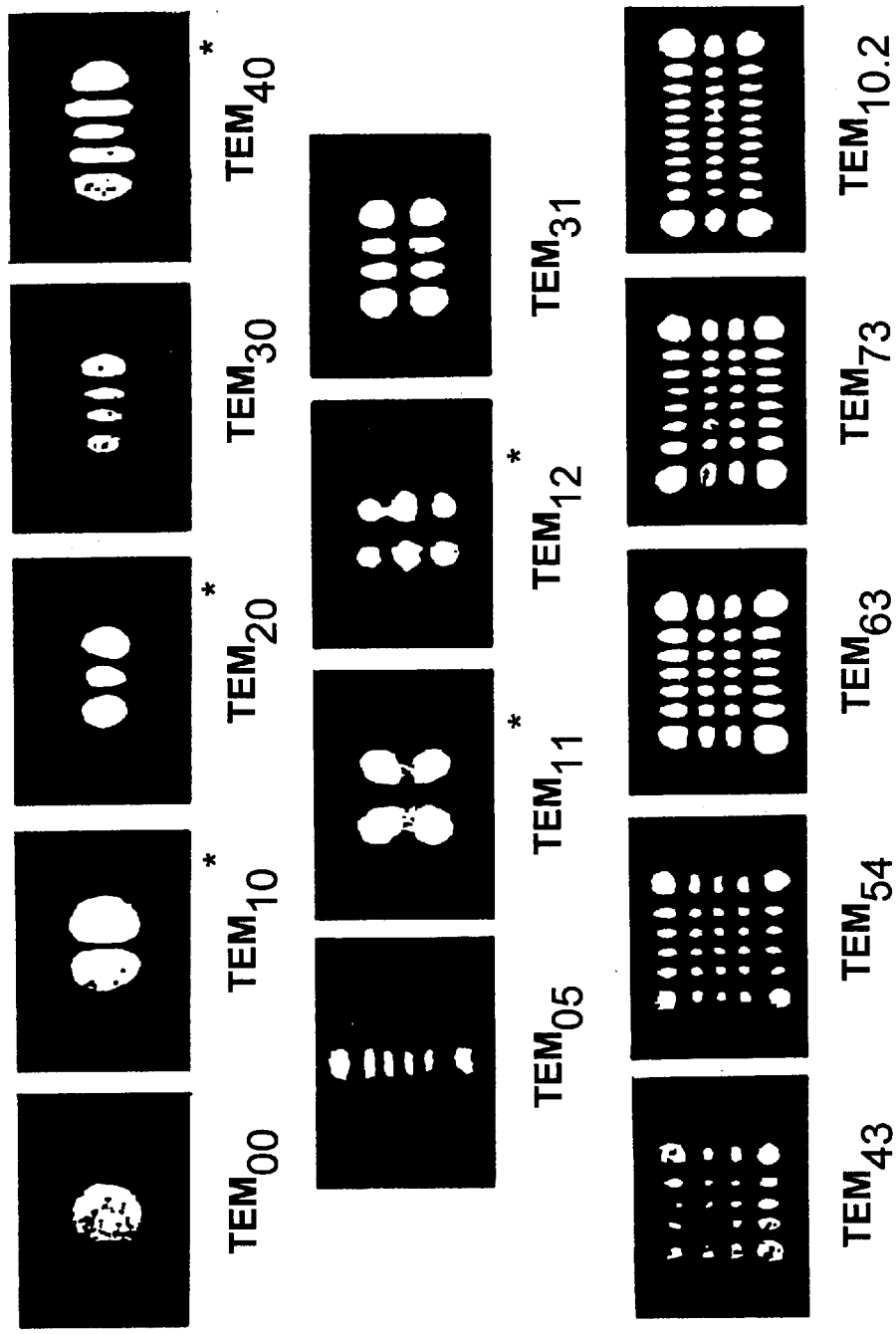
FIG. 1 — INTENSITY DISTRIBUTIONS OF TEM$_{mnq}$ MODES OF A CONFOCAL RESONATOR WITH RECTANGULAR MIRRORS (ACCORDING TO Ross 1966)

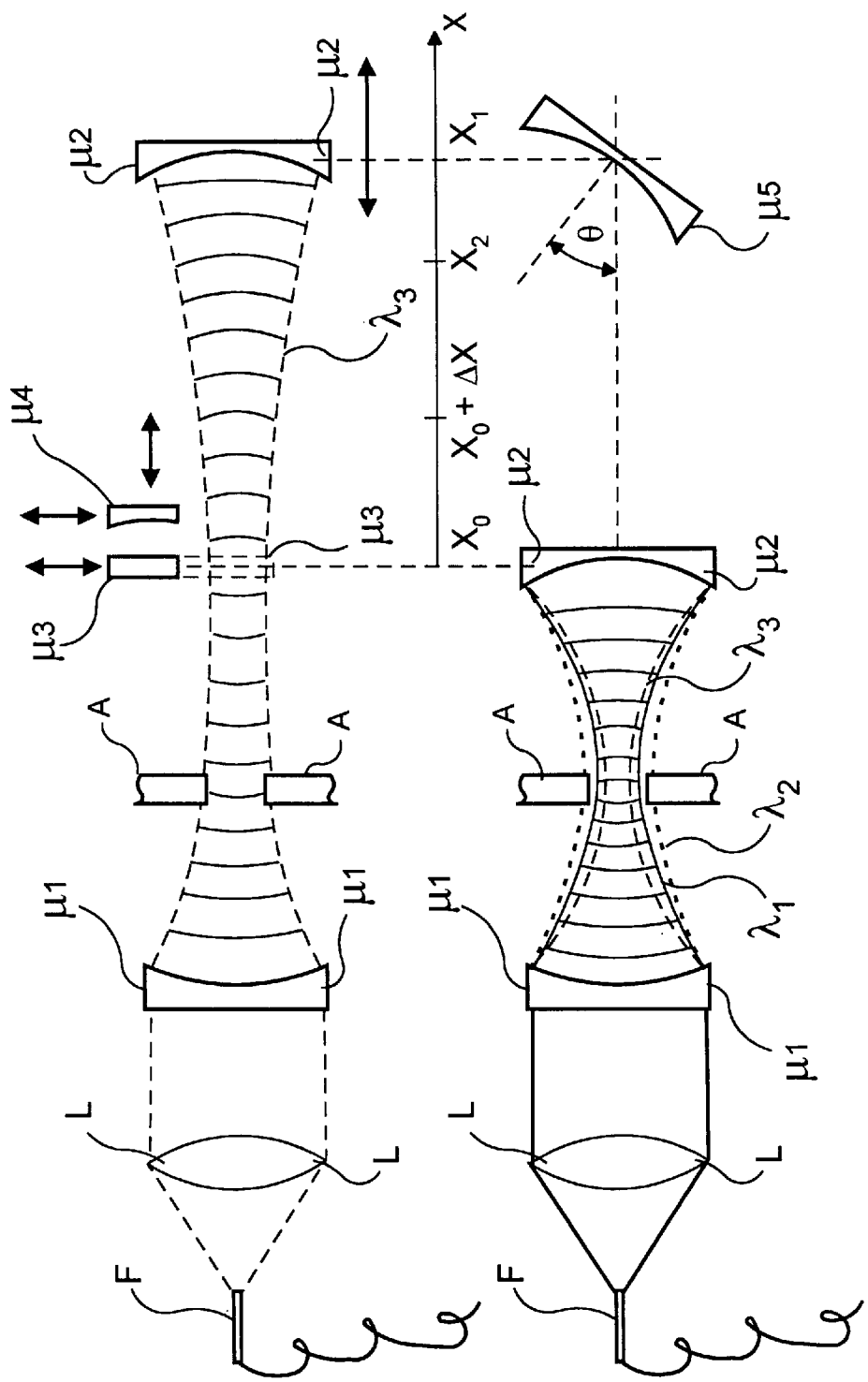
F I G. 2b    F I G. 2a

LASER RESONATOR DESIGN WITH IMPROVED SIGNAL-TO-NOISE LEVEL (S/N) AT THE OUTPUT OF A SINGLE-MODE FIBER-COUPLED MULTI-WAVELENGTH LASER PROVIDING ILLUMINATION FOR A LASER SCANNING MICROSCOPE

BACKGROUND OF THE INVENTION a) Field of the Invention

The invention describes a laser resonator design that provides a laser output with an extremely high signal-to-noise (S/N) -level in each laser line of a multi-wavelength laser coupled to a single-mode fiber or to a polarization-preserving single-mode fiber, such as a multi-wavelength Ar- or ArKr-ion gas laser, and the application of this laser as light source providing illumination for a laser scanning microscope.

b) Description of the Related Art

Fundamental Gaussian Mode

For many applications it is required, that the light that emerges from a laser at a given wavelength has a lateral spatial beam profile of a pure Gaussian $TEM_{oo}$-mode. This requires some technical means to suppress the propagation of higher order modes, $TEM_{mn}$, at this wavelength (laser line) inside the laser cavity. Typically this is done by using intracavity mode apertures (e.g. variable iris apertures or fixed apertures such as the laser capillary), that provide sufficient loss for the higher order Gaussian modes so that for those modes the gain from the active medium does not exceed the cavity losses after one round-trip in the laser resonator (higher order Gaussian modes have larger beam diameters as compared to the fundamental Gaussian mode; see FIG. 1). Therefore, these cavity modes will not be able to reach the laser threshold and are not present in the laser output.

Cavity Modes

The propagation of the $TEM_{mn}$-mode of a given laser line (wavelength $\lambda$) is described by the propagation theory of Gaussian modes (A. E. Siegman, 'Lasers', University Science Books, Mill Valley, Calif., 1986) If the laser resonator is a standing wave resonator, the cavity is typically formed by two concave, or by one flat and one concave mirror, respectively, where the concave side of the mirror(s) is facing the cavity. At the reflecting surface of the concave mirror, the radius of curvature of the mirror has to be identical to that of the Gaussian wave front of the laser beam propagating inside the cavity. Only then the mode is matched to the cavity and is not changed upon reflection at the concave mirror (condition that after one cavity round trip the mode reproduces itself). The same condition holds for the other cavity mirror. From the concave mirror, the mode propagates inside the cavity until it forms a beam waist (smallest beam diameter) at the waist location either inside the cavity (e.g. confocal, semi-confocal or nearly confocal cavity) or on a flat mirror (hemi-spherical cavity). The size of the beam waist depends on the wavelength of the laser radiation and is larger for longer wavelengths. Therefore, for a multi-wavelengths laser that uses a fixed intracavity mode aperture, a given $TEM_{mn}$-mode of the longer wavelength laser line is apertured more than the same mode of a shorter wavelength laser line. Typically, for multi-wavelength lasers, that aim for single-transverse mode operation (fundamental Gaussian mode $TEM_{oo}$) for all laser lines, the longest wavelength laser line is "over-apertured" (i.e. for this wavelength the aperture size is smaller than the beam diameter at the aperture position) while the shortest wavelength laser line is "under-apertured" (i.e. for this wavelength the aperture size is larger than the beam diameter at the aperture position, see FIG. 2a). This results in a pure fundamental Gaussian output ($TEM_{oo}$) with a somewhat lower intensity at the longest wavelength, while the shortest wavelength output is still a superposition of fundamental and higher order Gaussian modes.

Mode Competition

In a laser cavity, a mode will be able to reach the laser threshold only if the round-trip gain from the active laser medium exceeds the sum of all round-trip losses. Therefore, all modes present in a laser resonator at one laser line compete against each other to collect as much line inversion as possible. This phenomenon is known as mode competition and results in an exchange of energy between the different cavity modes over time. It can be observed as an intensity fluctuation over time in an isolated cavity mode. On the other hand, as the total amount of energy in all cavity modes for one laser line is constant (as long as no line competition is present), no fluctuation will be observed in the total line output intensity.

Single-mode Fiber Coupling

If the output of a multi-line laser as described above (pure fundamental Gaussian output at the longest wavelength, while the shortest wavelength output is still a superposition of fundamental and higher order modes) is coupled to a single-mode fiber with a cutoff wavelength ($\lambda_{cut-off}= 2*\pi*a*NA/2.405$, where a and NA are the core radius and the numerical aperture of the fiber, respectively) shorter than the shortest wavelength emitted by the laser, the fiber only propagates the fundamental Gaussian mode ($TEM_{oo}$) of each laser line and strips off all the higher order modes (spatial filter function of the single mode fiber). As a result, due to the separation of fundamental and higher order modes for the shortest wavelength, there can be a significant intensity fluctuation in the shortest wavelength laser line at the output of the single-mode fiber. For many applications in laser scanning microscopy, this cannot be accepted and was the driving force for this invention.

OBJECT AND SUMMARY OF THE INVENTION

The primary object of the invention was to overcome the intensity fluctuation in the shortest wavelength laser line at the output of the single-mode fiber, particularly in laser scanning microscopy applications.

In accordance with the invention, a single-mode fiber-coupled multi-wavelength laser having a laser cavity and a resonator mirror wherein, for suppressing higher order transverse modes of the laser cavity than $TEM_{oo}$ of at least one laser emission wavelength, the laser comprises at least one arrangement selected from the group consisting of:

a) at least one resonator mirror movable along the resonator axis in order to vary the resonator length;

b) at least one resonator mirror tiltable until a surface normal thereof encloses an angle ($\theta \neq 0$) with the resonator axis;

c) at least one resonator mirror being replaced by another concave mirror with different curvature radius;

d) at least one resonator mirror being replaced by a flat mirror; and e) at least one mirror holder allowing the interchangeable use of several mirrors with different curvature radii.

Also in accordance with the invention, a single-mode fiber-coupled multi-wavelength laser having a laser cavity and a resonator mirror, wherein, for increasing the beam waist diameters of the transverse laser cavity modes, the laser comprises at least one arrangement selected from the group consisting of:
a) at least one resonator mirror movable along the resonator axis in order to vary the resonator length;
b) at least one resonator mirror tiltable until a surface normal thereof encloses an angle (0≠0) with the resonator axis;
c) at least one resonator mirror replaced by another concave mirror with different curvature radius;
d) at least one resonator mirror being replaced by a flat mirror; and
e) at least one mirror holder allowing the interchangeable use of several mirrors with different curvature radii.

Still further in accordance with the invention, a single-mode fiber-coupled multi-wavelength laser having a cavity and a resonator mirror, wherein, for increasing the signal-to-noise level of the output of the laser at least one emission wavelength, the laser comprises at least one arrangement selected from the group consisting of:
a) at least one resonator mirror movable along the resonator axis in order to vary the resonator length;
b) at least one resonator mirror tiltable until a surface normal thereof encloses an angle (0≠0) with the resonator axis;
c) at least one resonator mirror replaced by another concave mirror with different curvature radius;
d) at least one resonator mirror being replaced by a flat mirror; and
e) at least one mirror holder allowing the interchangeable use of several mirrors with different curvature radii.

BRIEF DESCRIPTION OF THE DRAWINGS

In the drawings:

FIG. 1 is an illustration of the intensity distribution of $TEM_{mnq}$-modes of a confocal resonator with right angle mirrors;

FIG. 2a illustrates field distribution of the Gaussian fundamental cavity modes $TEM_{oo}$ in a multi-wavelength laser resonator with output coupler, high reflector rear mirror and fixed aperture for three beams of different wavelengths;

FIG. 2b illustrates an arrangement in accordance with the invention for overcoming disadvantages in FIG. 2a by shifting the rear mirror from its initial position along the optical axis of the resonator by a certain distance;

New Design of the Laser Resonator

Description of the Preferred Embodiments of the New Design of the Laser Resonator: than all the wavelengths emitted by the laser), the laser resonator design of a multi-wavelength laser has to be modified in such a way, that for each laser wavelength only the fundamental Gaussian mode ($TEM_{oo}$) builds up inside the laser cavity (see FIG. 2b). Therefore, all higher order modes have to be suppressed effectively for all laser lines. Both output coupler and rear mirror (high reflector) of the laser resonator are chosen to be concave mirrors in the following explanation and in FIG. 2, but in generally these mirrors may be flat also. If the radius of curvature of the rear mirror is increased, the beam waist diameters for all transverse modes inside the cavity increase. As a result, a larger portion of each mode is apertured at the given intracavity mode aperture resulting in a reduced output power at each laser wavelength. As all higher order modes have a wider lateral beam profile compared to the fundamental Gaussian mode, they are subject to higher intracavity aperture losses. At a given radius of curvature of the rear mirror, no higher order modes reach the laser threshold any more. This results in an abrupt increase of signal-to-noise for each of the laser lines at the output of the single-mode fiber (see FIG. 3–4).

According to FIG. 2b, the invention proposes to achieve this improvement of the signal-to-noise level of a single-mode fiber-coupled multi-wavelength laser by changing the beam waist diameter inside the laser cavity without modifying any other element of the resonator arrangement than the rear and/or the front mirror of the cavity by one of the following means:

a.) The holder of the mirror is modified in a way that the mirror may be moved along the optical axis of the resonator by a certain distance ($\Delta x \neq 0$).

b.) The holder of the mirror is modified in a way that the mirror may be tilted until its surface normal encloses a certain angle (0≠0) with the resonator axis—see mirror M5.

c.) The mirror is removed and another planar mirror placed at an appropriate position into the laser arrangement serves as cavity mirror—see mirror M3.

d.) The mirror is removed and another concave mirror placed at an appropriate position into the laser arrangement serves as cavity mirror—see mirror M4.

e.) The mirror is replaced by another concave mirror with enlarged curvature radius.

f.) The holder of the mirror is equipped with the option to allow the interchangeable use of several mirrors with different radii of curvature.

g.) The holder of the mirror is equipped in a way as to perform modifications of the laser resonator which represent any possible combination of the manipulations described in a.)–f.).

Laser Scanning Microscopy

Figure 5A:
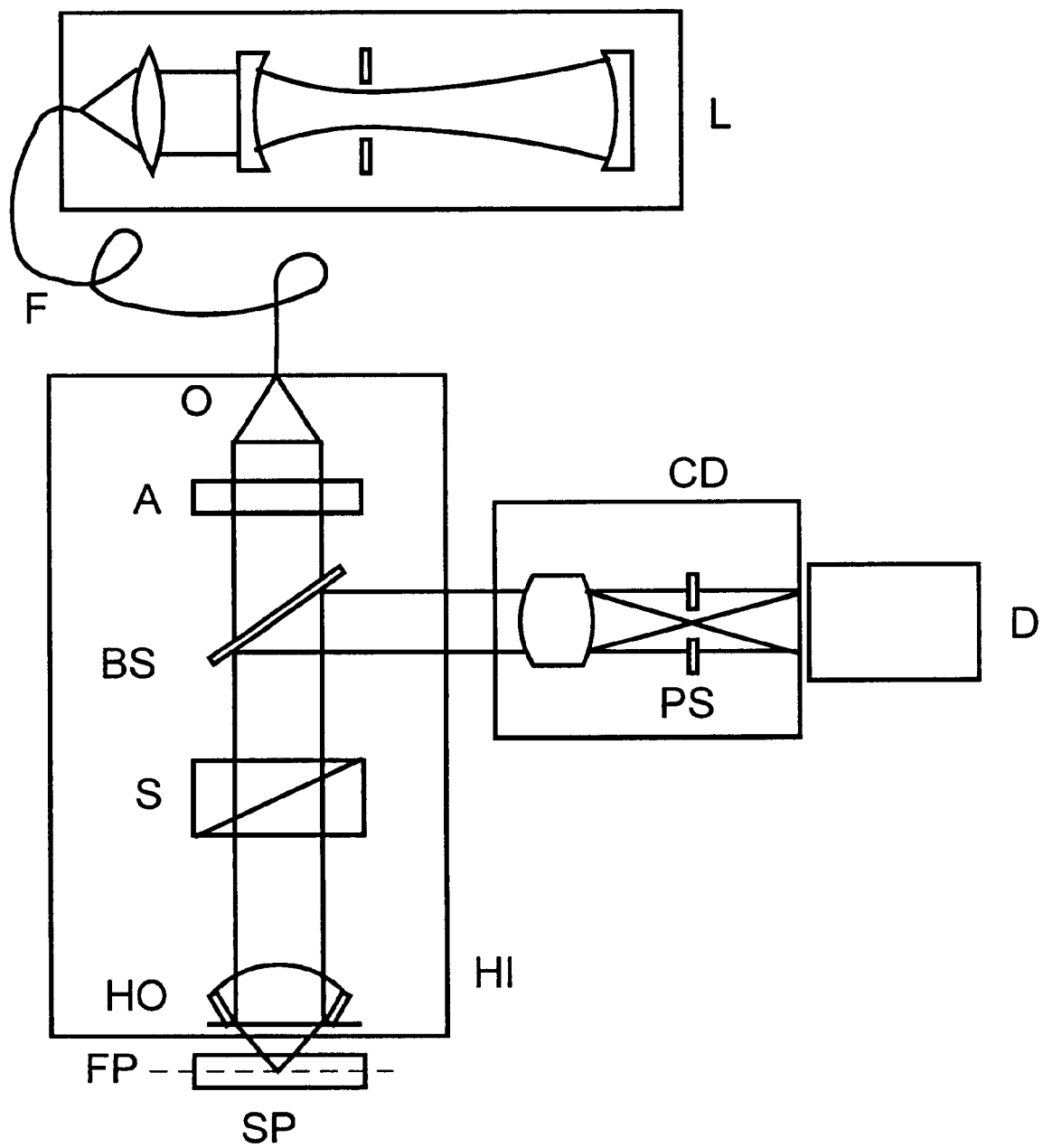
FIG. 5a illustrates a single-mode fiber-coupled multi-wavelength laser with improved signal-to-noise level employed as illustration source of a laser scanning microscope.

The invention proposes that a laser system utilizing a resonator design as described above is employed to provide illumination, for a laser scanning microscope (or for a confocal laser scanning microscope). This is depicted in FIG. 5a. The output of a single-mode fiber-coupled multi-wavelength laser with its signal-to-noise level improved according to the invention is fed into and aligned with the illumination beam path of a laser scanning microscope. The laser beam is focused by the microscope objective into the focal plane of the objective lying within the specimen. The signal emanating from the specimen is measured by a suitable detector. The signal detection may be performed employing a confocal detection scheme in which additionally a pinhole system for spatial filtering may be integrated.

Considering a laser system which is utilized as illumination source of a laser scanning microscope, there arise certain requirements concerning the specifications of this laser system which need to be met in order to ensure optimal performance and widest versatility of the microscope imaging system:

1.) For many applications (e.g. for biological confocal laser scanning microscopy) laser output has to be available simultaneously at various different wavelengths ($\lambda_1 > \lambda_2 > \ldots > \lambda_n$). Only then the advantages of multi-channel excitation and detection schemes may be applied to the study of the specimen.

2.) The laser beam is focused by the microscope objective to a diffraction-limited spot into the focal plane of the objective. If the laser beam exhibits a lateral spatial profile of a pure Gaussian TEM$_{oo}$ mode it can be focused to the smallest possible spot size ($\sim(\lambda NA)^2$, where $\lambda$ and NA are the laser wavelength and the numerical aperture of the microscope objective, respectively) Only in this case it is always possible to use the full resolving power of the microscope objective to form the image. Otherwise additional diffraction losses may occur and give rise to lower image quality. Consequently, it is desired that all wavelengths ($\lambda_1 \ldots \lambda_n$) emitted by the laser are available with a pure fundamental Gaussian mode profile (TEM$_{oo}$).

3.) Since the signal-to-noise level of the collected image directly reflects the signal-to-noise level of the laser used for illumination, the laser output at each particular emission wavelength ($\lambda_1 \ldots \lambda_n$) is required to be available with a signal-to-noise level which is as high as possible in order to ensure best image quality.

4.) By using an optical fiber to deliver the light beam from the laser source to the scanning microscope the following additional advantages are achieved: The modularity of the instrumentation is increased and more flexibility between the individual devices is provided. Since the hardware integration of the subsystems is reduced, a more compact design of these systems is possible. Moreover, the microscope system is both mechanically and thermally isolated from the laser source.

According to the invention, the requirements set forth in 1–4 above are perfectly met by the single-mode fiber-coupled multi-wavelengths laser described in in the embodiment of the invention described herein.

Fiber-coupling of Several Lasers

Certain applications (e.g. laser scanning microscopy,) may require a laser source providing simultaneously radiation at a manifold of different emission wavelengths ($\lambda = \lambda_1 \ldots \lambda_N$) which exceeds the number of wavelengths ($\lambda_1 \ldots \lambda_n$) available from one given single-mode fiber-coupled multi-wavelengths laser. In this case, the output of a single-mode fiber-coupled multi-wavelengths laser as described at the outset. (denoted as $L_1$, at $\lambda_i = \lambda_1 \ldots \lambda_n$) and the output of one other or of several other laser(s) (denoted as external laser(s) $L_2 \ldots L_k$, in generally at ($\lambda_{kj} \neq \lambda_1 \ldots \lambda_n$) may be superimposed in order to form a common beam combining the laser radiation at all desired wavelengths ($\lambda = \lambda_i, \lambda_{kj}$). The external laser(s) $L_2 \ldots L_k$ may be single-mode fiber-coupled multi-wavelengths laser(s) which correspond to the invention or any other particular single-line or multi-line laser(s) or any possible combination of those lasers. The invention proposes that the superposition of the output beam emitted by a single-mode fiber-coupled multi-wavelengths laser $L_1$ and of the output beam(s) emitted by the external laser(s) $L_2 \ldots L_k$ is achieved by coupling the output beams of the external laser(s) $L_2 \ldots L_k$ to the same single-mode fiber as the multi-wavelengths laser $L_1$ is coupled (see FIG. 5b). Following the discussion above, the highest signal-to noise level in each particular laser line (at $\lambda = \lambda_i$, $\lambda_{kj}$) and the best spatial overlap of all laser beams are achieved at the fiber output when pure fundamental Gaussian output beams (TEM$_{oo}$) are available at all emission wavelengths ($\lambda$) of all lasers $L_1, L_2 \ldots L_k$ coupled to the fiber and when the fiber propagates only these modes (i.e. $\lambda_{cut-off} > \lambda_i, \lambda_{kj}$) Moreover, at the fiber output, the beams of all lasers $L_1, L_2 \ldots L_k$ are perfectly aligned to each other. Then, all of the specifications pointed out in the laser scanning microcopy discussion are also met by this arrangement of the laser source.

A more detailed discussion of the various figures is presented below.

FIG. 1 illustrates intensity distribution of TEM$_{mn}$-Gaussian modes in a confocal laser resonator with rectangular mirrors. Higher order modes than TEM$_{oo}$ have a larger beam diameter and are subject to higher diffraction losses.

FIG. 2a illustrates field distribution of the Gaussian fundamental cavity modes TEM$_{oo}$ in a multi-wavelength laser resonator with output coupler (concave mirror M1), high reflector rear mirror (concave mirror M2) and fixed aperture (A) shown for three beams of different wavelengths $\lambda_1 > \lambda_2 > \lambda_3$. The aperture may be the laser capillary itself or any other part of the laser arrangement confining the laser beam within the cavity, The laser radiation which is extracted out of the cavity by the output coupler is coupled by means of a lens (L) into a single-mode optical fiber (F) which is also used to feed this radiation into the illumination beam path of a laser scanning microscope (see FIG. 5a). Due to their different wavelengths the three beams exhibit differing waist diameters at the position of the aperture. For a given resonator setup, the beam waist diameter increases with increasing laser wavelength. Therefore, the aperture stronger discriminates on longer wavelengths (here $\lambda_1$) whereas shorter wavelengths (here $\lambda_3$) are "under-apertured". Therefore, in this arrangement it is not possible to suppress higher order modes than TEM$_{oo}$ at the wavelength $\lambda_3$ by means of the fixed aperture.

FIG. 2b illustrates that in order to overcome this disadvantage the rear mirror (M2) is shifted apart from its initial position $x_0$ along the optical axis of the resonator by a certain distance $\lambda x > 0$. Hereby, the curvature radius of the Gaussian wave front at $x_0$ is increased relatively to its initial value. Therefore, the waist diameters of all transverse cavity modes are also increased by this modification of the laser cavity. This is shown exemplary for the TEM$_{oo}$ mode of the beam with the wavelength $\lambda_3$. As the lateral beam profile of a given cavity mode is the larger the higher the order (m,n) of the mode is (see FIG. 1), at a given position $x_0 + \Delta x_1$ the aperture provides only sufficient loss to prevent cavity modes of sufficiently high order ($n \geq n_s, m \geq m_s$) from reaching laser threshold whereas several lower order modes ($n < n_s, m < m_s$) pass the aperture without losses. By shifting the rear mirror further apart from the output coupler the number of these lower order modes is decreases due to the further increasing beam waist diameters of the cavity modes. The final position $x_1$ of the rear mirror is obtained when the aperture losses for all modes of higher order than TEM$_{oo}$ are sufficient as to prevent all these modes from reaching laser threshold. Then, for the laser beam with wavelength $\lambda_3$, only the fundamental Gaussian mode builds up inside the laser cavity and no mode competition occurs any more.

At the fiber output the signal-to-noise level of each emission wavelength with $\lambda \geq \lambda_3$ of the multi-line laser is increased to an optimum value, because in this arrangement the cavity modes of laser wavelengths with $\lambda \geq \lambda_3$ (here $\lambda_1$ and $\lambda_2$) are "over-apertured" as is evident from FIG. 2a. Therefore, the laser and, subsequently, the fiber output at these wavelengths correspond also to fundamental Gaussian TEM$_{oo}$ modes which exhibit a somewhat lowered intensity when compared to the initial cavity configuration.

At a certain position $x_p$ depending on the curvature radii of the cavity mirrors the wavefronts of the Gaussian TEM$_{oo}$ mode are planar. Hence, instead of shifting the rear mirror to $x_1$ a planar mirror serving as the rear mirror of the cavity may be inserted into the laser cavity at $x=x_p$ in order to suppress all other modes than $TEM_{oo}$. With increasing distance from $x_p$ the curvature radius of the wavefronts of the Gaussian $TEM_{oo}$ mode inside the cavity decreases until it reaches its minimum value at the rear mirror surface or at the front mirror surface, respectively. Therefore, the desired discrimination of all higher order modes than $TEM_{oo}$ is also achieved by inserting another concave rear mirror at $x=x_2$ into the laser cavity whose curvature radius is matched to the curvature radius of the corresponding wavefronts at $x_2$. In particular, the initial cavity rear mirror may be replaced by another mirror having an appropriately larger radius of curvature ($R_1 > R_2$).

Figure 3:
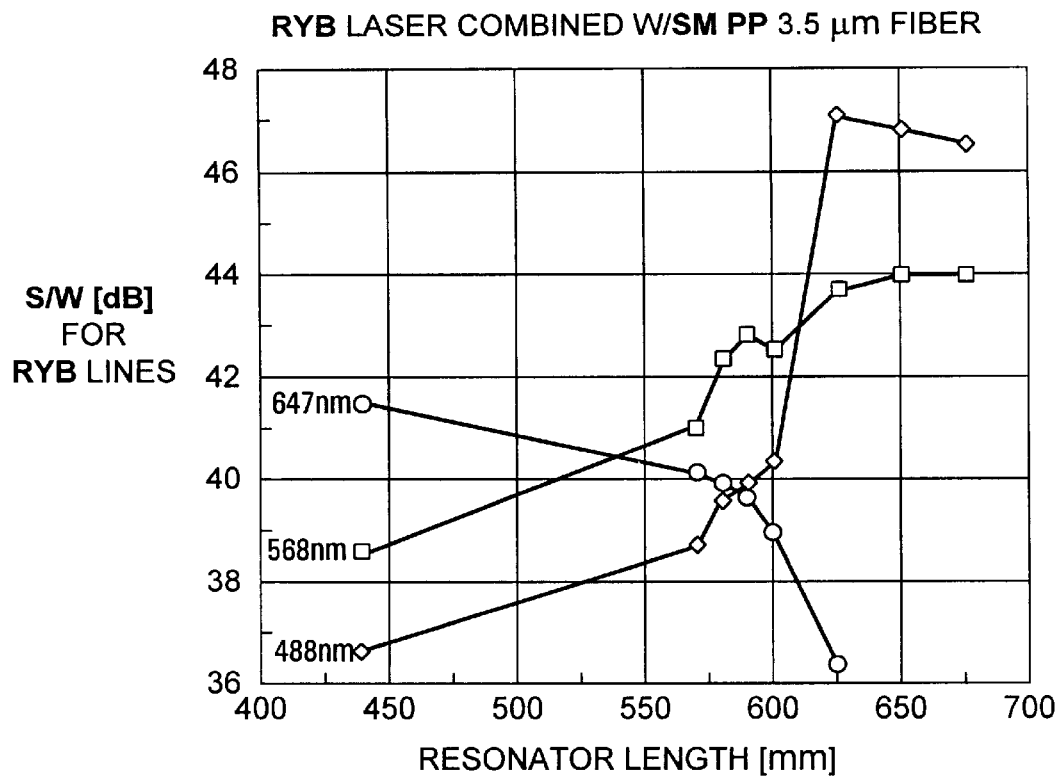
FIG. 3 illustrates the improved signal-to-noise level of a single-mode fiber-coupled multi-wavelength laser which is demonstrated by the measurements performed for the particular emission lines of a RYB $Ark_r$-ion laser at three wavelengths as a function of resonator length.

FIG. 3 shows that the improved signal-to-noise level of a single-mode fiber-coupled multi-wavelengths laser is demonstrated by the measurements performed for the particular emission lines of a RYB ArKr-ion laser at $\lambda_1=647$ nm, $\lambda_2=568$ nm and $\lambda_3=488$ nm as a function of the resonator length. The laser line at 647 nm consists of the fundamental Gaussian mode only, even in the initial resonator design. An increase of the intracavity mode diameter (shown as resonator length) for this laser line by moving the high reflector further apart results in a reduced output power at 647 nm and, as the line gets closer to the laser threshold, in a decrease of signal-to-noise. For the other laser lines, at 488 nm and at 568 nm, there exists a distinct cavity design, at which all higher order modes are suppressed due to aperture losses. This results in an abrupt increase in signal-to-noise after the fiber output. When restricting these laser lines by one of the methods described in V. to the fundamental Gaussian modes, they do not suffer from mode competition any more, which results in a laser line output with significantly reduces optical noise or higher signal-to-noise.

Figure 4:
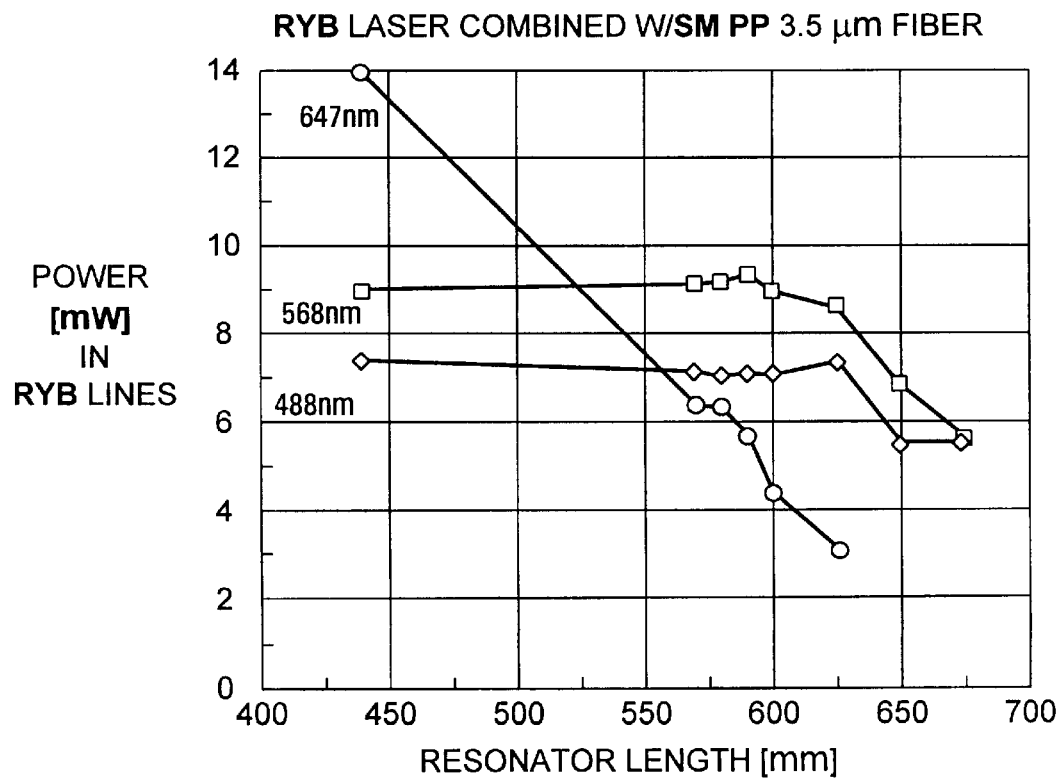
FIG. 4 illustrates laser output powers measured for the particular laser lines of FIG. 3.

FIG. 4 illustrates laser output powers measured for the particular laser lines described in FIG. 3. For the emission wavelengths at $\lambda_2=568$ nm and $\lambda_3=488$ nm the output power remains relatively constant while the output power at $\lambda_1=647$ nm decreases due to the reasons mentioned in the description of FIG. 3.

FIG. 5a illustrates a single mode fiber-coupled multi-wavelength laser with improved signal-to-noise level employed as illumination source of a laser scanning microscope. The output of the fiber (F) -coupled laser (L) is fed into the illumination beam path of a microscope (MI) by means of a fiber output coupler (O) and aligned by means of an alignment device (AD). The laser beam is focused by the microscope objective (MO) into the focal plane (FP) of the objective lying within the specimen (SP). The signal emanating from the specimen is measured by a suitable detector (D). The signal detection may be performed employing a confocal detection scheme (CD) in which additionally an optical pinhole system (PS) for spatial filtering may be integrated. Scanning of the laser beam is performed by means of the optical scanning system (S). BS—beamsplitter.

Figure 5B:
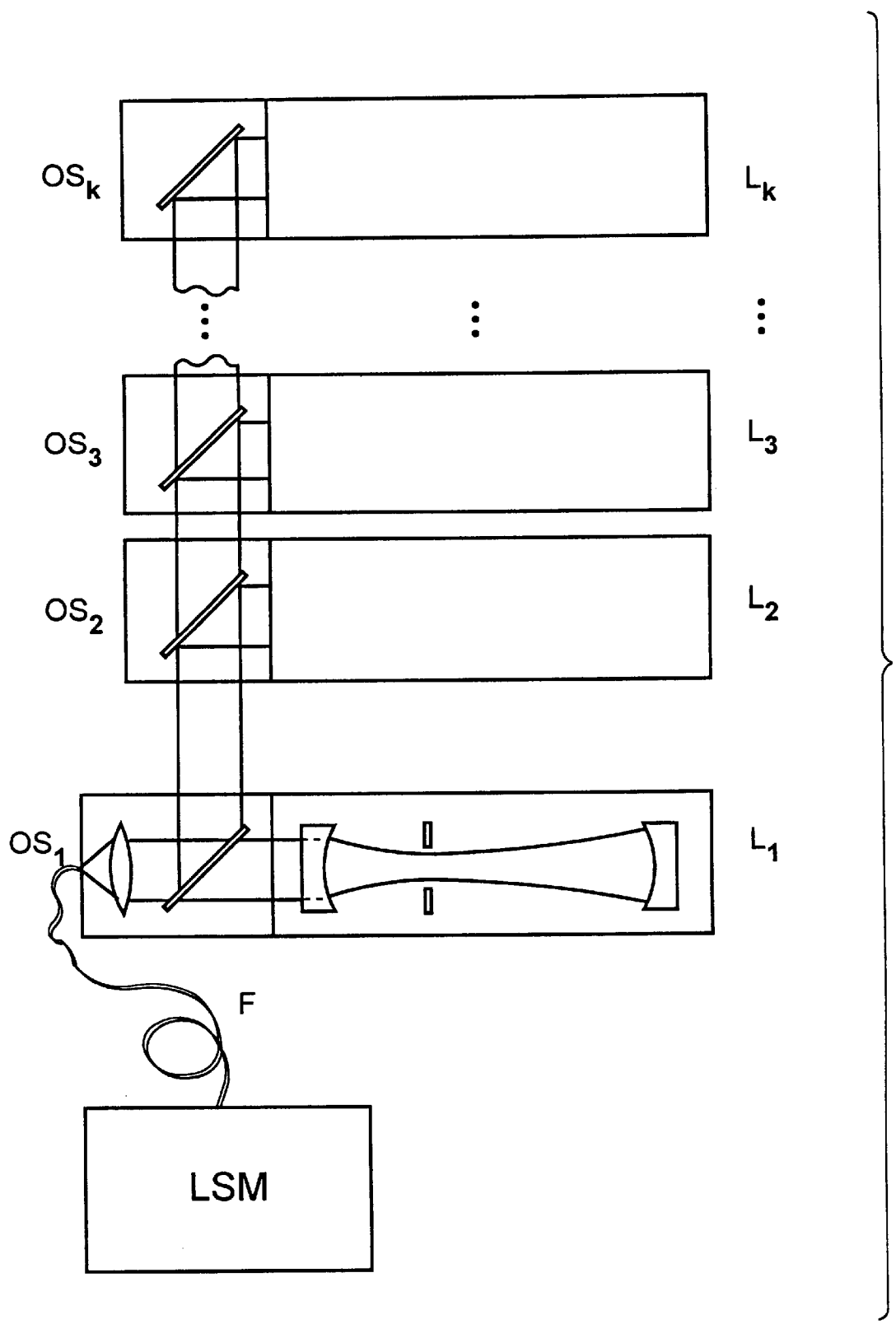
FIG. 5b illustrates the illumination of a laser-scanning microscope performed as described in FIG. 5a by a single-mode fiber-coupled multi-wavelength laser.

FIG. 5b illustrates the illumination of a laser scanning microscope (LSM) is performed as described in FIG. 5a by a single-mode fiber-coupled multi-wavelength laser ($L_1$). The output beams of other lasers ($L_2, L_3 \ldots L_k$) are coupled into the microscope through the same single-mode fiber (F) as the single-mode fiber-coupled multi-wavelength laser ($L_1$) by appropriate optical Systems ($OS_1, OS_2 \ldots OS_k$). In this way the beams of several lasers ($L_1, L_2, L_3 \ldots L_k$) are superimposed and fed together into the illumination beam path of the microscope. At the fiber output, the beams of all lasers $L_1, L_2 \ldots L_k$ are perfectly aligned to each other. By delivering laser radiation of additional wavelengths ($\lambda_{kj}$) to the microscope, a considerable increase of the versatility of the system is achieved with a minimum effort. The laser(s) $L_2 \ldots L_k$ may be single-mode fiber-coupled multi-wavelengths laser(s) which correspond to the invention or any other particular single-line or multi-line laser(s) or any possible combination of those lasers.

While the foregoing description and drawings represent the preferred embodiments of the present invention, it will be obvious to those skilled in the art that various changes and modifications may be made therein without departing from the true spirit and scope of the present invention.

What is claimed is:

1. A single-mode multi-wavelength laser having a laser cavity and a resonator mirror wherein, for suppressing higher order transverse modes of the laser cavity than $TEM_{oo}$ of at least one laser emission wavelength, said laser comprising:

at least one arrangement selected from the group consisting of:
 a) at least one resonator mirror movable along the resonator axis in order to vary the resonator length;
 b) at least one resonator mirror tiltable until a surface normal thereof encloses an angle ($0 \neq 0$) with the resonator axis;
 c) at least one resonator mirror being replaced by a concave mirror with different curvature radius;
 d) at least one resonator mirror being replaced by a flat mirror; and
 e) at least one mirror holder allowing the interchangeable use of several mirrors with different curvature radii; and a variable intracavity aperture.

2. A single-mode multi-wavelength laser having a laser cavity and a resonator mirror wherein, for increasing the beam waist diameters of the transverse laser cavity modes, said laser comprising:

at least one arrangement selected from the group consisting of:
 a) at least one resonator mirror movable along the resonator axis in order to vary the resonator length;
 b) at least one resonator mirror tiltable until a surface normal thereof encloses an angle ($0 \neq 0$) with the resonator axis;
 c) at least one resonator mirror being replaced by a concave mirror with different curvature radius;
 d) at least one resonator mirror being replaced by a flat mirror; and
 e) at least one mirror holder allowing the interchangeable use of several mirrors with different curvature radii; and a variable intracavity aperture.

3. A single-mode multi-wavelength laser having a laser cavity and a resonator mirror wherein, for increasing the signal-to-noise level of the output of the laser at least at one emission wavelength said laser comprising:

at least one arrangement selected from the group consisting of:
 a) at least one resonator mirror movable along the resonator axis in order to vary the resonator length;
 b) at least one resonator mirror tiltable until a surface normal thereof encloses an angle ($0 \neq 0$) with the resonator axis;
 c) at least one resonator mirror being replaced by a concave mirror with different curvature radius;
 d) at least one resonator mirror being replaced by a flat mirror; and
 e) at least one mirror holder allowing the interchangeable use of several mirrors with different curvature radii; and a variable intracavity aperture.

4. A single-mode multi-wavelength laser having a laser cavity and a resonator mirror wherein, for suppressing higher order transverse modes of the laser cavity than $TEM_{oo}$ of at least one laser emission wavelength said laser comprising:

at least one arrangement selected from the group consisting of:
a) at least one resonator mirror movable along the resonator axis in order to vary the resonator length;
b) at least one resonator mirror tiltable until a surface normal thereof encloses an angle ($0 \neq 0$) with the resonator axis;
c) at least one resonator mirror being replaced by a concave mirror with different curvature radius;
d) at least one resonator mirror being replaced by a flat mirror; and
e) at least one mirror holder allowing the interchangeable use of several mirrors with different curvature radii; and an intracavity aperture which is defined by any part of the laser arrangement confining the laser beam within the cavity.

5. The laser system of claim 4 including a laser capillary.

6. A single-mode multi-wavelength laser having a laser cavity and a resonator mirror wherein, for suppressing higher order transverse modes of the laser cavity than $TEM_{oo}$ of at least one laser emission wavelength, said laser comprising:

at least one arrangement selected from the group consisting of:
a) at least one resonator mirror movable along the resonator axis in order to vary the resonator length;
b) at least one resonator mirror tiltable until a surface normal thereof encloses an angle ($0 \neq 0$) with the resonator axis;
c) at least one resonator mirror being replaced by a concave mirror with different curvature radius;
d) at least one resonator mirror being replaced by a flat mirror; and
e) at least one mirror holder allowing the interchangeable use of several mirrors with different curvature radii; and at least one other laser and wherein an output beam of said at least one other laser is coupled to a same fiber as the single-mode multi-wavelength laser.

7. A single-mode multi-wavelength laser having a laser cavity and a resonator mirror wherein, for increasing the beam waist diameters of the transverse laser cavity modes, said laser comprising:

at least one arrangement selected from the group consisting of:
a) at least one resonator mirror movable along the resonator axis in order to vary the resonator length;
b) at least one resonator mirror tiltable until a surface normal thereof encloses an angle ($0 \neq 0$) with the resonator axis;
c) at least one resonator mirror being replaced by a concave mirror with different curvature radius;
d) at least one resonator mirror being replaced by a flat mirror; and
e) at least one mirror holder allowing the interchangeable use of several mirrors with different curvature radii; and at least one other laser and wherein an output beam of said at least one other laser is coupled to a same fiber as the single-mode multi-wavelength laser.

8. A single-mode multi-wavelength laser having a laser cavity and a resonator mirror wherein for increasing the signal-to-noise level of the output of the laser at least at one emission wavelength said laser comprising:

at least one arrangement selected from the group consisting of:
a) at least one resonator mirror movable along the resonator axis in order to vary the resonator length;
b) at least one resonator mirror tiltable until a surface normal thereof encloses an angle ($0 \neq 0$) with the resonator axis;
c) at least one resonator mirror being replaced by a concave mirror with different curvature radius;
d) at least one resonator mirror being replaced by a flat mirror; and
e) at least one mirror holder allowing the interchangeable use of several mirrors with different curvature radii; and at least one other laser and wherein an output beam of said at least one other laser is coupled to a same fiber as the single-mode multi-wavelength laser.

9. A laser scanning microscope, comprising:

a single-mode multi-wavelength laser having a laser cavity and a resonator mirror wherein, for suppressing higher order transverse modes of the laser cavity than $TEM_{oo}$ of at least one laser emission wavelength, said laser including at least one arrangement selected from the group consisting of:
a) at least one resonator mirror movable along the resonator axis in order to vary the resonator length;
b) at least one resonator mirror tiltable until a surface normal thereof encloses an angle ($0 \neq 0$) with the resonator axis;
c) at least one resonator mirror being replaced by a concave mirror with different curvature radius;
d) at least one resonator mirror being replaced by a flat mirror; and
e) at least one mirror holder allowing the interchangeable use of several mirrors with different curvature radii.

10. A laser scanning microscope, comprising:

a single-mode multi-wavelength laser having a laser cavity and a resonator mirror wherein, for increasing the beam waist diameters of the transverse laser cavity modes, said laser including at least one arrangement selected from the group consisting of:
a) at least one resonator mirror movable along the resonator axis in order to vary the resonator length;
b) at least one resonator mirror tiltable until a surface normal thereof encloses an angle ($0 \neq 0$) with the resonator axis;
c) at least one resonator mirror being replaced by a concave mirror with different curvature radius;
d) at least one resonator mirror being replaced by a flat mirror; and
e) at least one mirror holder allowing the interchangeable use of several mirrors with different curvature radii.

11. A laser scanning microscope, comprising:

a single-mode multi-wavelength laser having a laser cavity and a resonator mirror wherein, for increasing the signal-to-noise level of the output of the laser at least at one emission wavelength said laser including at least one arrangement selected from the group consisting of:
a) at least one resonator mirror movable along the resonator axis in order to vary the resonator length;
b) at least one resonator mirror tiltable until a surface normal thereof encloses an angle ($0 \neq 0$) with the resonator axis;

c) at least one resonator mirror being replaced by a concave mirror with different curvature radius;

d) at least one resonator mirror being replaced by a flat mirror; and e) at least one mirror holder allowing the interchangeable use of several mirrors with different curvature radii.

12. A confocal laser scanning microscope, comprising:

a single-mode multi-wavelength laser having a laser cavity and a resonator mirror wherein, for suppressing higher order transverse modes of the laser cavity than $TEM_{oo}$ of at least one laser emission wavelength, said laser including at least one arrangement selected from the group consisting of:

a) at least one resonator mirror movable along the resonator axis in order to vary the resonator length;

b) at least one resonator mirror tiltable until a surface normal thereof encloses an angle ($0 \neq 0$) with the resonator axis;

c) at least one resonator mirror being replaced by a concave mirror with different curvature radius;

d) at least one resonator mirror being replaced by a flat mirror; and e) at least one mirror holder allowing the interchangeable use of several mirrors with different curvature radii.

13. A confocal laser scanning microscope, comprising:

a single-mode multi-wavelength laser having a laser cavity and a resonator mirror wherein, for increasing the beam waist diameters of the transverse laser cavity modes, said laser including at least one arrangement selected from the group consisting of:

a) at least one resonator mirror movable along the resonator axis in order to vary the resonator length;

b) at least one resonator mirror tiltable until a surface normal thereof encloses an angle ($0 \neq 0$) with the resonator axis;

c) at least one resonator mirror being replaced by a concave mirror with different curvature radius;

d) at least one resonator mirror being replaced by a flat mirror; and e) at least one mirror holder allowing the interchangeable use of several mirrors with different curvature radii.

14. A confocal laser scanning microscope, comprising:

a single-mode multi-wavelength laser having a laser cavity and a resonator mirror wherein, for increasing the signal-to-noise level of the output of the laser at least at one emission wavelength said laser including at least one arrangement selected from the group consisting of:

a) at least one resonator mirror movable along the resonator axis in order to vary the resonator length;

b) at least one resonator mirror tiltable until a surface normal thereof encloses an angle ($0 \neq 0$) with the resonator axis;

c) at least one resonator mirror being replaced by a concave mirror with different curvature radius;

d) at least one resonator mirror being replaced by a flat mirror; and e) at least one mirror holder allowing the interchangeable use of several mirrors with different curvature radii.

* * * * *